(12) United States Patent
Moresco

(10) Patent No.: US 6,324,436 B1
(45) Date of Patent: Nov. 27, 2001

(54) METHOD FOR OPTIMIZING COST OF MANUFACTURING MEMORY ARRAYS

(75) Inventor: Larry L. Moresco, San Carlos, CA (US)

(73) Assignee: Fujitsu Limited (JP)

( * ) Notice: Subject to any disclaimer, the term of this patent is extended or adjusted under 35 U.S.C. 154(b) by 0 days.

(21) Appl. No.: 09/152,739

(22) Filed: Sep. 14, 1998

(51) Int. Cl.⁷ .......................... G05B 13/02; G06F 19/00; H03M 13/00
(52) U.S. Cl. .............................. 700/36; 700/121; 714/755
(58) Field of Search .................. 700/36, 110, 121; 714/755; 716/3

(56) References Cited

U.S. PATENT DOCUMENTS

| | | | |
|---|---|---|---|
| 4,335,459 | 6/1982 | Miller | 371/38 |
| 4,495,559 | * 1/1985 | Gelatt | 700/28 |
| 4,908,772 | 3/1990 | Chi | 364/491 |
| 5,144,563 | 9/1992 | Date et al. | 364/491 |
| 5,200,908 | 4/1993 | Date et al. | 364/491 |
| 5,202,840 | 4/1993 | Wong | 364/490 |
| 5,208,759 | 5/1993 | Wong | 364/468 |
| 5,222,031 | 6/1993 | Kaida | 364/491 |
| 5,251,147 | 10/1993 | Finnerty | 364/490 |
| 5,272,664 | 12/1993 | Alexander et al. | 365/52 |
| 5,512,765 | 4/1996 | Gaverick | 257/202 |
| 5,828,578 | * 10/1998 | Blomgren | 716/3 |

* cited by examiner

Primary Examiner—William Grant
Assistant Examiner—Ronald D Hartman, Jr.
(74) Attorney, Agent, or Firm—Coudert Brothers

(57) ABSTRACT

A method of determining the most cost effective manner in which to provide a given number of memory or logic gates for a particular application. The method takes into consideration both the cost per memory bit of fabricating memory cells on a semiconductor chip as a function of the number of memory cells on the chip (i.e, the chip size), and the costs of assembling multiple memory chips into a larger memory device using different assembly and packaging configurations. By considering the fabrication and packaging costs together, the most economically efficient combination of memory chip size and packaging method to produce a desired memory capacity can be determined.

9 Claims, 4 Drawing Sheets

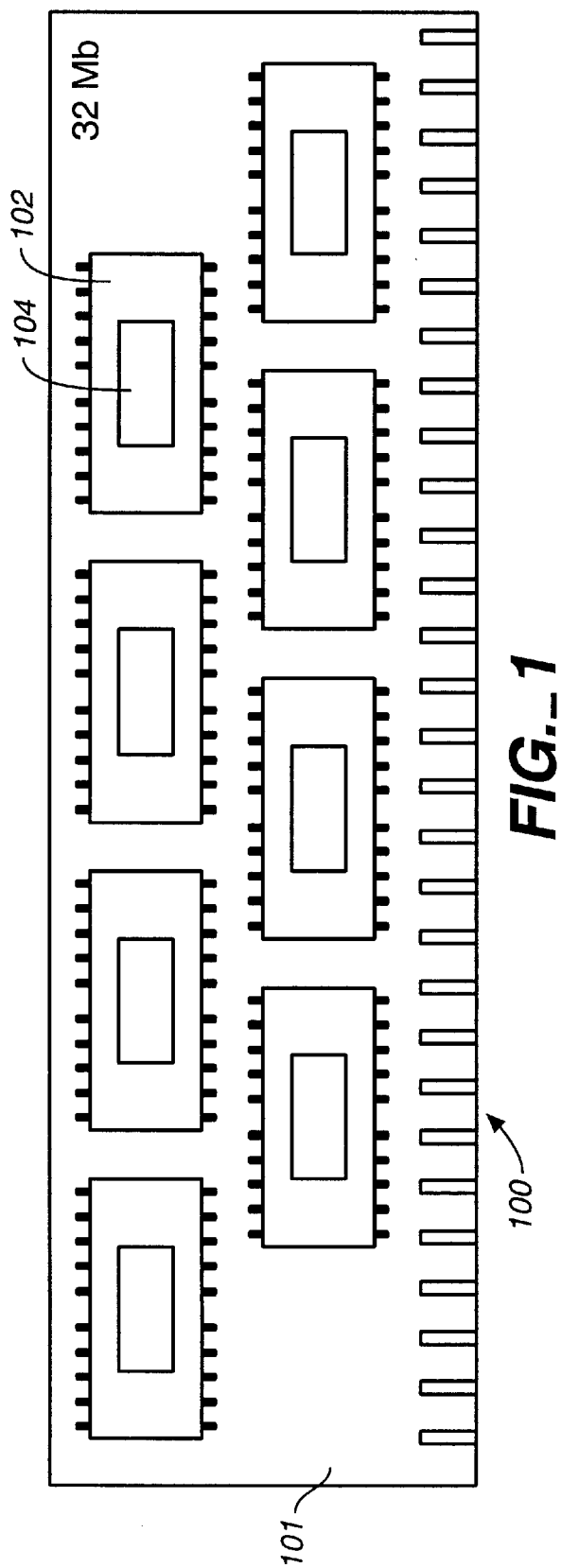
FIG._1
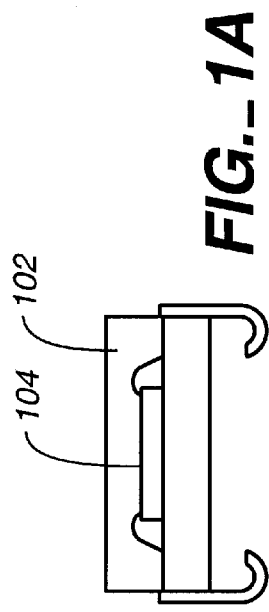
FIG._1A

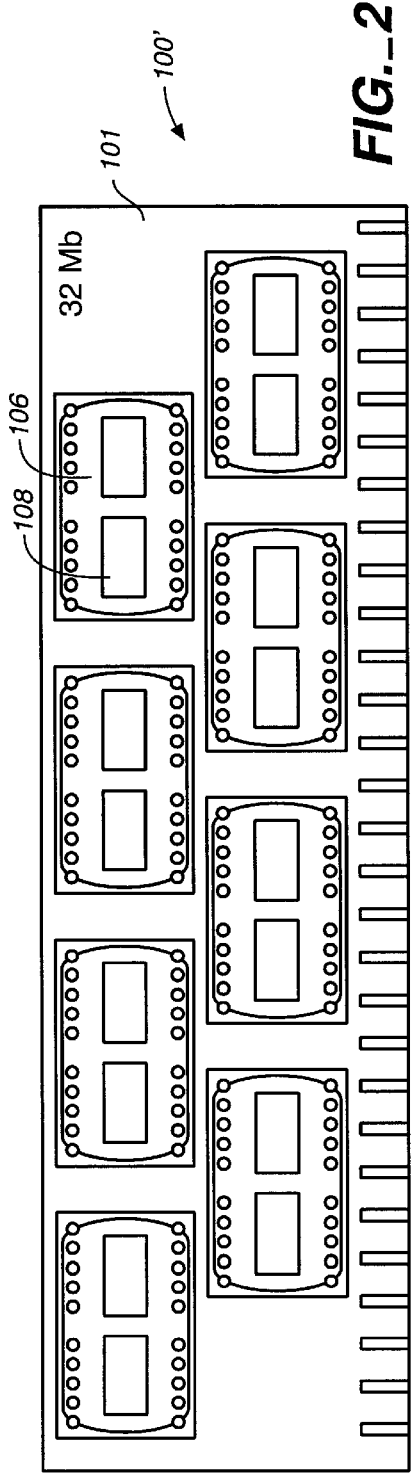
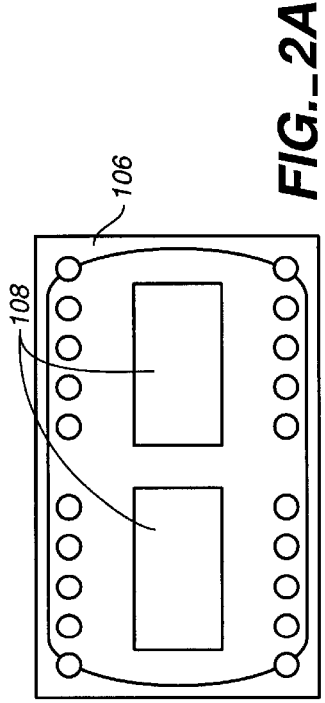
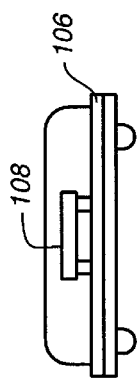
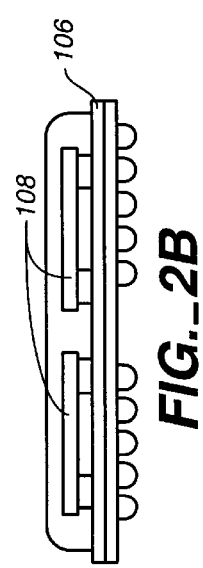
FIG._2
FIG._2A
FIG._2B
FIG._2C

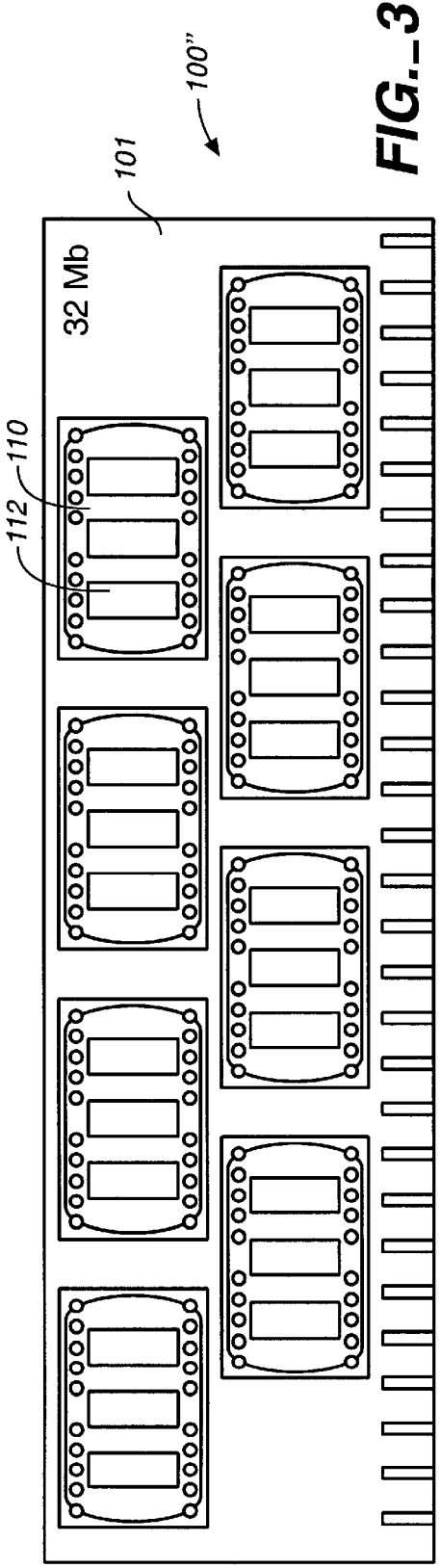
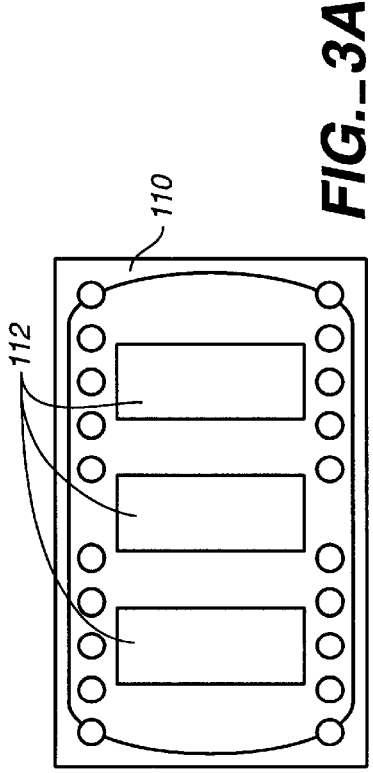
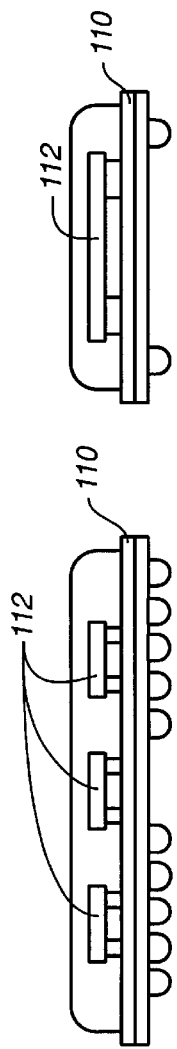
FIG._3
FIG._3A
FIG._3B
FIG._3C

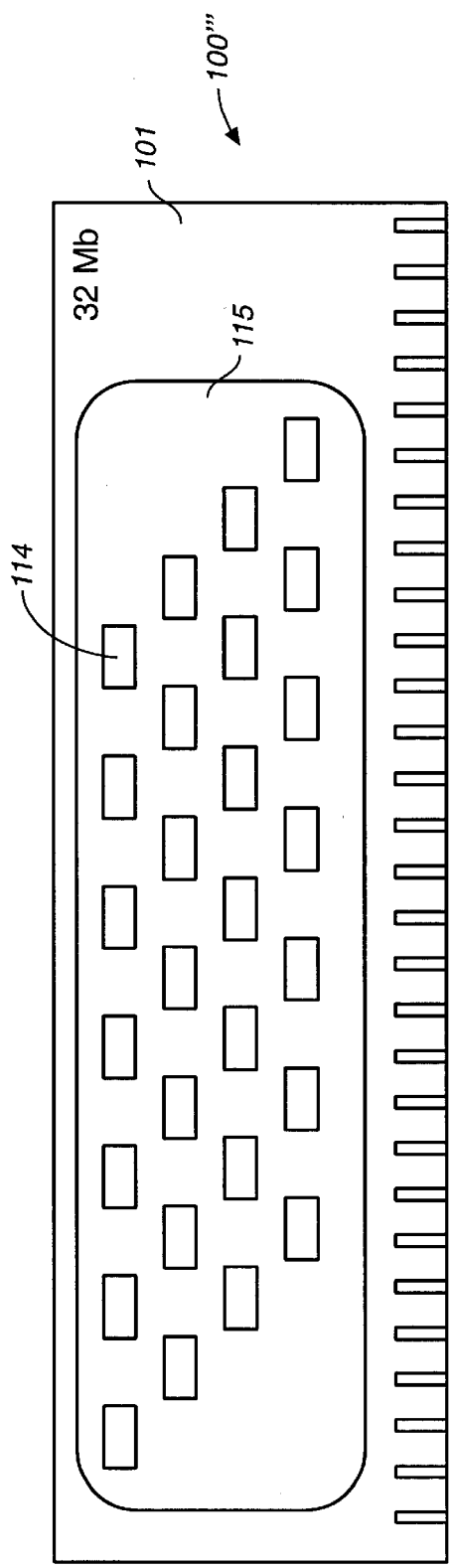
FIG._4A
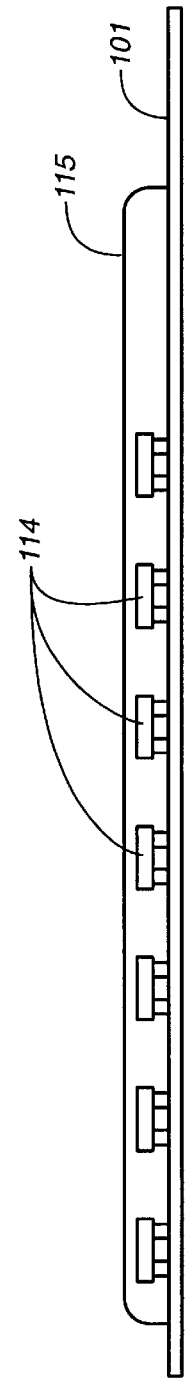
FIG._4B

METHOD FOR OPTIMIZING COST OF MANUFACTURING MEMORY ARRAYS

BACKGROUND OF THE INVENTION

1. Field of the Invention

The present invention relates to methods of manufacturing arrays of memory cells, and more specifically, to a method of optimizing the cost of manufacturing such devices by considering both the cost of manufacturing different capacity memory chips and of assembling multiple memory chips into larger capacity memory array packages. The inventive method can also be applied to optimize the manufacture of an array of logic gates or similar devices.

2. Description of the Prior Art

Memory is an essential component of computers as well as many other types of electronic devices. As the functionality of these devices increase, so does the demand for additional memory capacity. Thus, it becomes important to determine the most economically efficient way to provide the desired memory capacity. However, there are many factors which influence the cost of a specified size memory array. These include the cost of the semiconductor material (wafer) from which the individual memory chips (die) are fabricated, the cost of processing the wafer to form the desired memory elements, the cost of manufacturing chip carriers or substrates to hold multiple chips, the cost of assembling multiple chips onto a carrier, the cost of mounting multiple chip carriers to a substrate and packaging the substrate, and the cost of testing the packaged devices.

The cost of the semiconductor material (e.g., silicon) used to fabricate an integrated circuit chip having a large number of memory cells or logic gates is a function of the yield (Y) of the fabrication process flow used to form the chip (or die) from the wafer. The yield is a function of both the area (A) of the die on which the memory cells are formed and the density of the defects generated during the fabrication process (expressed in terms of defects per unit area). A yield function dependent on the die area and defect density can be used to determine the percentage of usable die yielded by the process flow. This factor can then be multiplied by the number of die fabricated to determine the number of usable die produced by the process flow from a given size wafer. Most yield functions for commonly used fabrication processes are non-linear with respect to die size, i.e., the percentage of usable yielded dies decreases at a faster rate than the die size increases. Assuming a fixed size for a single memory cell, this means that the cost of manufacturing an array of memory cells increases at a faster rate than that at which the number of memory cells on a die increases. Thus, the fabrication cost per memory cell is an increasing function of the memory die size.

The non-linear increase of the semiconductor material and fabrication cost as a function of the memory cell or logic gate capacity of a die means that the cost of fabricating a large capacity memory chip can quickly become prohibitive for some applications. Yet, these same applications may require a large amount of available memory or large number of logic gates to provide a desired range of functions.

Traditionally, the demand for increased memory capacity has been addressed by developing larger capacity memory chips, i.e., single chips having a greater number of memory cells. This has been the motivation behind the enormous development costs and time directed to the design and fabrication of memory chips having a capacity of 8 k (8 thousand), 16 k, 32 k, 64 k, etc. memory cells. However, with the size of a memory cell remaining approximately constant, this means that the size of the chip increases approximately linearly as the capacity increases. With the manufacturing costs for a single high capacity memory chip increasing faster than the number of memory cells on the chip, the cost per bit of memory increases as the capacity of the chip increases. Thus, satisfying the need for higher capacity memory or logic gate arrays by manufacturing larger capacity memory or logic gate chips may not be the most economically efficient response to the problem.

What is desired is a method of optimizing the cost of manufacturing high capacity memory or logic gate arrays. The method should enable a designer to determine how to provide the amount of memory or logic gates needed for an application in the most cost effective manner. In this regard, it is desired that the method enable a designer to consider the cost factors involved in manufacturing a high capacity array and identify the most optimal combination of memory die capacity, number of memory dies, assembly, packaging technique, etc. for manufacturing the array.

SUMMARY OF THE INVENTION

The present invention is directed to a method of determining the most cost effective manner in which to provide a given number of memory or logic gates for a particular application. The method takes into consideration both the cost per memory bit of fabricating memory cells on a semiconductor chip as a function of the number of memory cells on the chip (i.e, the chip size), and the costs of assembling multiple memory chips into a larger memory device using different assembly and packaging configurations. By considering the fabrication and packaging costs together, the most economically efficient combination of memory chip size and packaging method to produce a desired memory capacity can be determined.

BRIEF DESCRIPTION OF THE DRAWINGS

FIG. 1 shows a 32 Mb memory array formed from eight 4 Mb single chip packages.

FIG. 1A shows an enlarged end view of a chip package shown in FIG. 1

FIG. 2 shows a 32 Mb memory array formed from eight 4 Mb assemblies, with each assembly formed from two memory chips.

FIGS. 2A–2C show enlarged top-plan, side, and end views, respectively, of an assembly shown in FIG. 2.

FIG. 3 shows a 32 Mb memory array formed from eight 4 Mb assemblies, with each assembly formed from three memory chips.

FIGS. 3A–3C show enlarged top-plan, side, and end views, respectively, of an assembly shown in FIG. 3.

FIG. 4A shows a top-plan view of a 32 Mb memory array formed from previously tested known good dies, and FIG. 4B shows a side view thereof.

DETAILED DESCRIPTION OF THE INVENTION

The present invention is directed to a method of reducing the cost of manufacturing arrays of memory cells for use in computers and other electronic devices. The inventive method may also be used for reducing the cost of manufacturing other high capacity devices, such as arrays of logic elements. The ability to create a lower cost per unit memory capacity for a computer or other electronic device provides a significant economic advantage, particulary as the demand for greater memory capacity increases. The inventive method utilizes existing technology so that new technology is not required to achieve this advantage.

In practicing the invention, knowledge of the yield functions and costs of different capacity (size) memory chips and of different methods of assembling multiple memory chips into higher capacity packages is required. If the yield function for fabricating memory chips using a desired process flow and the costs to manufacture, assemble, and test the memory components are known, the inventive method permits a user to optimize the cost of manufacturing a high capacity memory array by determining the most economically efficient combination of memory chip size and packaging method.

The inventive method will now be described in detail with reference to the manufacture of a high capacity memory array. Starting from the wafer on which the memory devices are to be fabricated, the useful wafer area for creating memory chips, $A_W$, is determined. This is the area of the wafer surface, excluding the wasted wafer edges and flat. Now assume a memory chip frame (or die) of dimensions, X by Y (corresponding to a chip frame area of X*Y). Next, the number of chip frames, N, which can be formed in the available area is determined. Thus, $N=A_W/(X*Y)$. More precisely, N equals the greatest integer resulting from dividing $A_W$ by (X*Y), or Int $[A_W/(X*Y)]$.

Next, using the yield function for the sequence of fabrication processes utilized to manufacture the memory cells to form the chips, the percentage of yielded die, $\chi$, obtained by processing the required chip frame area is determined. The yield functions are typically a function of the defect density $\delta$ (defects/mm$^2$) and a defect clustering factor, C, which is a measure of the position correlation between separate defects. A value for C of 2.5 is typical. A typical yield function is $\chi=(1+(X*Y)\delta/C)^{-C}$. A variety of values for the defect density and clustering factor as well as other suitable yield functions may be used, depending upon the specific fabrication process(es) being utilized. Note that while each yield function or class of such functions may produce a different optimal solution to the problem solved by the present invention, that nevertheless an optimum will generally exist.

From the yield expression, the number (expressed as a percentage) of yielded usable memory chips from a wafer of available area $A_w$ can be determined. The number of yielded memory chips is obtained by multiplying the yield percentage ($\chi$) by the number of memory chips per available wafer area, N. Then, by knowing the fabrication cost per wafer, $C_w$, the manufacturing cost, $C_c$, per yielded "untested" memory chip frames can be determined. This is found from the expression $C_c=C_w/(\chi*N)$. Note that this expression is for the cost per memory chip frame yielded by the modeled fabrication process, and does not include the cost of testing the chip frames to determine the "good" chips. For purposes of comparing different manufacturing methods, an important value is the cost per memory bit. To arrive at this cost it is necessary to account for several factors which reduce the area on a chip frame available for fabricating memory cells. These factors include the Kerf area, $A_k$, (the area lost when the frames are sawed to separate them from the chip), and the number of pads (terminations) on a chip. The number of pads per chip is important because it determines the area of the buffers per pad, $A_p$, required to send data to and receive data from the chip.

Subtracting these areas from the memory frame area results in the active area available for memory bits, $(X*Y-A_k-A_p)$. This value is divided by the area required for a single bit on the chip, $A_b$, to obtain the number of memory bits per frame, $[(X*Y-A_k-A_p)/A_b]$. Note that if a single bit is contained in each memory cell, then the area per bit is the memory cell area. If a multi-state memory cell is used, the effective area per bit is found by dividing the memory cell area by the number of bits in the cell. Dividing the manufacturing cost per yielded "untested" memory chip frame, $C_c$, by the number of memory bits per frame yields the cost per "untested" memory bit, $C_b$, where $C_b=C_c/[(X*Y-A_k-A_p)/A_b]=(C_c*A_b)/(X*Y-A_k-A_p)$.

The above analysis has determined the cost per bit of manufacturing untested memory. However, the total cost to manufacture a desired size memory array is more than just the cost per bit multiplied by the number of bits. As mentioned, the total cost includes assembly, packaging, and testing costs. In order to demonstrate how each of the factors discussed interact with the fabrication cost to determine the optimal memory chip size and assembly and packaging methods, an example will be given of different ways in which to manufacture a given amount of memory.

As an example, consider a common memory array, a SIMM card for a personal computer. In the example, it is assumed that a memory capacity of 32 megabytes (32 Mb) is desired. It is assumed that an eight inch diameter circular wafer is used, which costs $950 to process, plus an additional $50 to solder bump the wafer for flip chip assembly. The memory bit (cell) size is assumed to be 2.8 microns ($\mu$m) by 2.8 microns (i.e., $A_b=7.8 \mu m^2$). The cost to assemble a flip chip part is assumed to be $0.02 per chip. The board area required for a chip on board (COB) assembly is assumed to be 5 times the area of a chip, or a 20% chip to board area ratio. The cost of the board for a chip on board assembly is assumed to be $1.00 per square inch. Note that even though example numbers are given, the actual numbers used when practicing the invention will depend upon the available fabrication and assembly methods. For purposes of explaining the present invention, the numbers used are not as important as the method being described to arrive at the lowest cost to manufacture the desired number of bits of memory.

For the multi-chip assembly of a standard SIMM package, it is assumed that the necessary memory chips will be assembled into chip on board (COB) assemblies without testing. Subsequent testing would then determine which COB assemblies are used to provide the COB assemblies mounted on a substrate to form the standard SIMM board. Note that the cost estimates obtained from evaluating the examples should take into account the overall yield resulting from using multiple memory chips. In this regard, the yield for an assembly of multiple chips equals $(\chi)^m$, where $\chi$ is the yield from the wafer defect density and clustering formula for a single chip, and m is the number of chips in a multi-chip COB assembly.

FIG. 1 shows a 32 Mb memory array 100 formed from eight 4 Mb single chip packages 102 mounted on a SIMM printed circuit board (PCB) 101. FIG. 1A is an enlarged end view of a chip 102. Each single chip package 102 is shown as a standard J-lead DIP SIMM package containing a single memory chip 104 on which 8 Mb memory cells are formed. A die size of 4 mm by 8 mm is assumed. For a standard J-Lead DIP SIMM, an assumption of $3.00 per chip for wire bonding, plastic molding, and testing was made. Thus the final estimated cost per tested memory bit for the configuration of FIG. 1 can be determined by taking into account the cost per bit for manufacturing the unpackaged memory cells, and adding in the assembly and packaging costs for a specified packaging process, and the testing cost. As shown in FIG. 1, the assumptions made in this example lead to a cost of $38.68 for the 32 Mb memory array.

FIG. 2 shows a 32 Mb memory array 100' formed from eight 4 Mb assemblies 106 mounted on a SIMM PCB 101, with each assembly formed from two memory chips 108. Thus, in the FIG. 2 example, each memory chip 108 has a capacity of 2 Mb. FIG. 2A is an enlarged top-plan view of an assembly 106 with chips 108, FIG. 2B is an enlarged side view thereof, and FIG. 3C is an enlarged end view thereof. Each memory chip is formed on a die of dimensions 2.85 mm by 5.70 mm. Two such memory chips are fabricated and then flip-chip bonded to a chip on board (COB) substrate to form each assembly 106. The COB assemblies 106 are then attached to SIMM PCB 101 using a ball grid array to form memory array 100'. Note that in the manufacturing example corresponding to FIG. 2, the individual memory chips 108 are assembled to the COB substrate prior to testing of the memory cells. Any COB assemblies having memory cells which fail the test process are then discarded. The assumptions made in this example lead to a cost of $24.52 for the 32 Mb memory array, wich is a 37% decrease in manufacturing cost over the approach of FIG. 1.

The overall decrease in cost to manufacture the 32 Mb memory array using the approach of FIG. 2 relative to that of FIG. 1 results from a trade-off between two primary factors. These are the reduction in cost of fabricating the smaller 2 Mb memory die (the surface area of the die is smaller than for the 4 Mb example of FIG. 1, so the yield is correspondingly higher) and the increased assembly and packaging cost for the configuration of FIG. 2 compared to the "standard" mounting method of FIG. 1.

FIG. 3 shows a 32 Mb memory array 100" formed from eight 4 Mb assemblies 110 mounted on a SIMM PCB 101, with each assembly formed from three memory chips 112. Thus, in the FIG. 3 example, each memory chip has a capacity of 1.33 Mb. FIG. 3A is an enlarged top-plan view of an assembly 110 with chips, FIG. 3B is an enlarged top-plan view of an assembly 110 with chips, FIG. 3B is an enlarged side view thereof, and FIG. 3C is an enlarged end view thereof. Each memory chip is formed on a die of dimensions 2.37 mm by 4.74 mm. Three such memory chips are fabricated and then flip-chip bonded to a chip on board (COB) substrate to form each assembly 110. The COB assemblies 110 are then attached to SIMM PCB 101 by a ball grid array to form memory array 100. Note that in the manufacturing example corresponding to FIG. 3, the individual memory chips 112 are assembled to the COB substrate prior to testing of the memory cells. Any COB assemblies having memory cells which fail the test process are then discarded. The assumptions made in this example lead to a cost of $23.58 for the 32 Mb memory array, which is a 39% decrease in manufacturing cost over the approach of FIG. 1.

Note that for the examples of both FIG. 2 and FIG. 3, the overall manufacturing cost may be reduced by repairing the "bad" COB assemblies, rather than discarding them and replacing them with new ones. Any net cost reduction depends upon the relative cost of repair versus fabrication and assembly of a new COB assembly.

FIG. 4A shows a top-plan view of a 32 Mb memory array 100 formed from previously tested "known good dies" 114 which are individually mounted on SIMM PCB 101, and FIG. 4B shows a side view thereof. Each memory chip is formed on a die of dimensions 2.17 mm by 4.34 mm. In this example, the memory chips 114 are tested prior to further assembly (e.g., on a COB substrate as in FIGS. 2 and 3). The faulty dies are discarded and only good dies are then assembled onto a COB carrier or substrate 115. The carrier or substrate is then mounted to SIMM PCB 101. The assumptions made in this example lead to a cost of $12.73 for the 32 Mb memory array, which is a 67% decrease in manufacturing cost over the approach of FIG. 1. As shown by the example of FIG. 4, depending upon the relative costs of each step in the manufacturing process, an overall cost reduction can be obtained in some circumstances by altering the sequence in which certain of the fabrication, assembly, and testing steps are carried out.

Based on the assumed manufacturing and packaging costs, the 3 chips per COB assembly of FIG. 3 is the lowest cost to manufacture of the four examples discussed. The 2 chips per COB assembly of FIG. 2 is slightly more expensive, but may be preferable due to reasons of ease of testing, reliability, etc.

As seen from the examples shown in the figures, improvements in the overall manufacturing cost are made possible by evaluating and conducting trade-offs between the individual chip fabrication and the multi-chip assembly costs. Of course, the final estimated cost to manufacture a specified size memory or logic gate array will vary from the examples given depending on the fabrication, assembly, testing, and packaging processes used, the relative cost of each, and how those costs scale with increased die size. Additional information which provides a better estimate of the actual cost of a manufacturing step (e.g., testing) will also influence the analysis and assist in determining an optimal combination of die size and assembly and packaging techniques for the memory array.

In general, and based on the assumptions described for the examples given, larger memory capacity arrays formed from smaller modules show an improvement in manufacturing costs over forming an array from fewer, larger capacity modules. Thus, instead of trying to build larger memory chips, the analysis and optimization technique of the present invention suggests that it is preferable to invest in lower cost packaging and test techniques to be applied to smaller chips. In this way, the overall manufacturing cost may be many times cheaper for the same total memory capacity.

It is noted that the present invention may be implemented in the form of a programmed digital computing device or as entries in a spreadsheet program which is configured to update the result as the entries are altered. This permits an analysis of the trade-offs which affect the final outcome of the inventive optimization process.

The terms and expressions which have been employed herein are used as terms of description and not of limitation, and there is no intention in the use of such terms and expressions of excluding equivalents of the features shown and described, or portions thereof, it being recognized that various modifications are possible within the scope of the invention claimed.

What is claimed is:

1. A method of manufacturing a memory array, comprising:

selecting a first value of a memory cell capacity of a memory die;

determining a cost to fabricate the memory die having the selected memory cell capacity;

selecting an assembly and packaging method for assembling a plurality of memory die having the selected memory cell capacity into the memory array;

determining a cost to assemble the plurality of memory die into the memory array using the selected assembly and packaging method;

determining an overall cost of manufacturing the memory array by combining the costs of fabricating the plurality of memory die and assembling and packaging the die;

selecting a second value of a memory cell capacity of a memory die; and repeating the steps of the method required to determine an overall cost to manufacture the memory array from a plurality of memory die having a memory cell capacity equal to the second value.

2. The method of claim 1, further comprising the step of:

manufacturing the memory array using memory die having the memory cell capacity value which results in a lower overall manufacturing cost.

3. The method of claim 1, wherein the step of determining a cost to fabricate the memory die further comprises:

selecting a fabrication process flow for fabricating the memory die; and selecting a yield function corresponding to the process flow.

4. A method of manufacturing a memory array, comprising:

selecting a value of a memory cell capacity of a memory die;

determining a cost to fabricate the memory die having the selected memory cell capacity;

selecting a first assembly and packaging method for assembling a plurality of memory die having the selected memory cell capacity into the memory array;

determining a cost to assemble the plurality of memory die into the memory array using the first assembly and packaging method;

determining an overall cost of manufacturing the memory array by combining the costs of fabricating the plurality of memory die and assembling and packaging the die using the first assembly and packaging method;

selecting a second assembly and packaging method for assembling a plurality of memory die having the selected memory cell capacity into the memory array;

determining a cost to assemble the plurality of memory die into the memory array using the second assembly and packaging method; and determining an overall cost of manufacturing the memory array by combining the costs of fabricating the plurality of memory die and assembling and packaging the die using the second assembly and packaging method.

5. The method of claim 4, further comprising the step of:

manufacturing the memory array using the assembly and packaging method which results in a lower overall manufacturing cost.

6. The method of claim 4, wherein the step of determining a cost to fabricate the memory die further comprises:

selecting a fabrication process flow for fabricating the memory die; and selecting a yield function corresponding to the process flow.

7. A method of manufacturing a memory array, comprising:

selecting a first value of a memory cell capacity of a memory die;

determining a cost to fabricate the memory die having a memory cell capacity equal to the first value;

selecting an assembly and packaging method for assembling a plurality of memory die having the first memory cell capacity value into the memory array;

determining a cost to assemble the plurality of memory die having the first memory cell capacity value into the memory array using the selected assembly and packaging method;

determining an overall cost of manufacturing the memory array by combining the costs of fabricating the plurality of memory die and of assembling and packaging the die;

selecting a second value of a memory cell capacity of a memory die;

determining a cost to fabricate the memory die having a memory cell capacity equal to the second value;

selecting an assembly and packaging method for assembling a plurality of memory die having the second memory cell capacity value into the memory array;

determining a cost to assemble the plurality of memory die having the second memory cell capacity value into the memory array using the selected assembly and packaging method; and determining an overall cost of manufacturing the memory array by combining the costs of fabricating the plurality of memory die and of assembling and packaging the die.

8. The method of claim 7, further comprising the step of:

manufacturing the memory array using the memory die capacity value and assembly and packaging method which results in the lower overall manufacturing cost.

9. The method of claim 7, wherein the step of determining a cost to fabricate the memory die further comprises:

selecting a fabrication process flow for fabricating the memory die; and selecting a yield function corresponding to the process flow.

* * * * *